(12) United States Patent
Pan et al.

(10) Patent No.: US 8,503,198 B2
(45) Date of Patent: Aug. 6, 2013

(54) HIGH BOOST RATIO DC CONVERTER

(75) Inventors: Ching-Tsai Pan, Hsinchu (TW);
Chao-Han Lee, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 216 days.

(21) Appl. No.: 13/107,844

(22) Filed: May 13, 2011

(65) Prior Publication Data

US 2012/0249100 A1    Oct. 4, 2012

(30) Foreign Application Priority Data

Mar. 31, 2011  (TW) .............................. 100111203 A

(51) Int. Cl.
*H02M 3/335* (2006.01)
*G05F 1/00* (2006.01)

(52) U.S. Cl.
USPC ................................ 363/25; 363/24; 323/222

(58) Field of Classification Search
USPC .. 363/21.04, 21.06, 21.1, 24, 25, 26; 323/222
See application file for complete search history.

(56) References Cited

U.S. PATENT DOCUMENTS

| | | | | |
|---|---|---|---|---|
| 5,598,326 A | * | 1/1997 | Liu et al. | 363/34 |
| 5,627,737 A | * | 5/1997 | Maekawa et al. | 363/40 |
| 6,239,584 B1 | * | 5/2001 | Jang et al. | 323/222 |
| 6,989,997 B2 | * | 1/2006 | Xu et al. | 363/16 |
| 7,480,156 B1 | * | 1/2009 | Wittenbreder, Jr. | 363/20 |
| 2003/0103362 A1 | * | 6/2003 | Gan et al. | 363/25 |
| 2004/0027842 A1 | * | 2/2004 | Tanabe et al. | 363/133 |
| 2004/0184289 A1 | * | 9/2004 | Vinciarelli | 363/15 |
| 2006/0171181 A1 | * | 8/2006 | Clavel | 363/131 |
| 2009/0244944 A1 | * | 10/2009 | Jang et al. | 363/126 |
| 2010/0085032 A1 | * | 4/2010 | Duan et al. | 323/351 |
| 2011/0205762 A1 | * | 8/2011 | Pan et al. | 363/21.04 |
| 2012/0025720 A1 | * | 2/2012 | Chen et al. | 315/185 R |

* cited by examiner

*Primary Examiner* — Bao Q Vu
*Assistant Examiner* — Yusef Ahmed
(74) *Attorney, Agent, or Firm* — Cheng-Ju Chiang

(57) ABSTRACT

Disclosed is a high boost ratio DC converter, wherein the first and second switches are controlled by a control chip and the control chip controls the first and second switches in the following sequence: the first and second switches both conduct; the first switch conducts and the second switch is cut off; the first and second switches both conduct; the first switch is cut off and the second switch conducts thus making a first and second inductors and a first and second clamp capacitors charge to a first and second output capacitors. Then the first and second output capacitors discharge a load. Therefore, the load voltage output from the DC power supply will be boosted owing to the discharged load from the first and second output capacitors. The boost ratio is 4/(1−D).

6 Claims, 5 Drawing Sheets

US 8,503,198 B2

HIGH BOOST RATIO DC CONVERTER

BACKGROUND OF THE INVENTION

1. Field of the invention The present invention relates to a direct current (DC) converter with a high boost ratio, in particular, to a high boost ratio DC converter based on the integration of a multiple voltage converter and an auxiliary boost circuit, whereby changing the circuit topology not only has the advantage of initiating current flow, but also results in the circuit components not requiring a high voltage load carrying capability so as to decrease losses when switching the switch and when conducting so as to aid and increase the efficiency of the high boost ratio DC converter.

2. Description of Related Art

The use of energy leads to the development of human civilization, and large enterprises around the world have gradually noted the seriousness of oil pollution, and gradually alternative energies such as solar and fuel cells have begun to be developed. For example, solar power generation utilizes photoelectric conversion to convert the photoelectrons into a DC voltage, however this needs a high boost ratio converter to boost the voltage to a sufficiently high DC link voltage if supplying electric power to a general household, so as to enable the DC-AC converter to output alternating current (AC) voltage to power general household appliances.

According to a traditional DC boost converter which discloses a zigzag device having N-legged cores, wherein N is the number of phases which is greater than or equal to 2; a plurality of diodes, each P side of the diodes connected to each leg of the cores of the device; and a plurality of transistors, and each drain terminal of the transistors connected to each leg of the cores of the device.

However, the transformer of the conventional DC boost converter is non-isolated, which has cores able to work in a high-frequency environment. Although a conventional DC boost converter with a high frequency zigzag transformer is capable of reducing current ripple, simplifying current control, and achieving better transient response, the converter still has the following disadvantages: increasing the converter size and cost, the Core loss and Copper loss of the transformer reducing the overall efficiency of the converter, and the energy leakage increases the stresses on the switch.

Thus, there are still a lot of drawbacks in the above mentioned conventional goods, which are not of a good design and need to be amended.

In view of the shortcomings derived from a conventional DC boost converter, the inventor is eager to modify and innovate, and after years of painstaking research requiring great concentration, has finally successfully developed the high boost ratio DC converter of the invention.

SUMMARY OF THE INVENTION

The purpose of the present invention is to provide a high boost ratio DC converter, which has a high conversion ratio without any transformers.

Another purpose of the present invention is to provide a high boost ratio DC converter, which not only has the advantage of initiating current flow, but also has circuit components not requiring a high voltage load carrying capability, thus decreasing losses when switching the switch and when conducting as to aid and increase the efficiency of the high boost ratio DC converter.

The foregoing purpose of the invention can be achieved by a high boost ratio DC converter, including: a first switch circuit, a second switch circuit, a second storage circuit and a load circuit;

Wherein, the first switch circuit is connected to a DC power supply, the first switch circuit having at least one first inductor and at least one first switch; the second switch circuit connects to the first switch circuit, the second switch circuit having at least one second inductor and at least one second switch;

The first storage circuit connecting to the second switch circuit, the first storage circuit having at least one set of diodes, at least one first clamp capacitor and at least one first output capacitor; the second storage circuit connecting to the second circuit, the second storage circuit having at least one set of diodes, at least one second clamp capacitor and at least one second output capacitor;

the load carrying circuit connecting to the first output capacitor and the second output capacitor, the load carrying circuit having at least one load, making the first and second output capacitors discharge the load;

When using, the first and second switches are controlled by a control chip and the control chip controls the first and second switches in the following sequences: operating mode 1: the first and second switches both conduct; operating mode 2: the first switch conducts and the second switch is cut off; operating mode 3: the first and second switches both conduct; operating mode 4: the first switch is cut off and the second switch conducts thus making the first and second inductors charge to the first and second clamp capacitors, and making the first and second clamp capacitors discharge to the first and second output capacitors, and making the first and second output capacitors discharge the load, the load voltage output from the DC power supply will be boosted owing to the discharging of the first and second output capacitors. The boost ratio of the DC converter is 4/(1−D), which is not only a high conversion ratio without any transformer but also decreases losses when switching the switch and when conducting as to aid and increase the efficiency of the high boost ratio DC converter.

The invention, as well as its many advantages, may be further understood by the following detailed description and drawings in which:

DETAILED DESCRIPTION OF THE INVENTION

Figure 1:
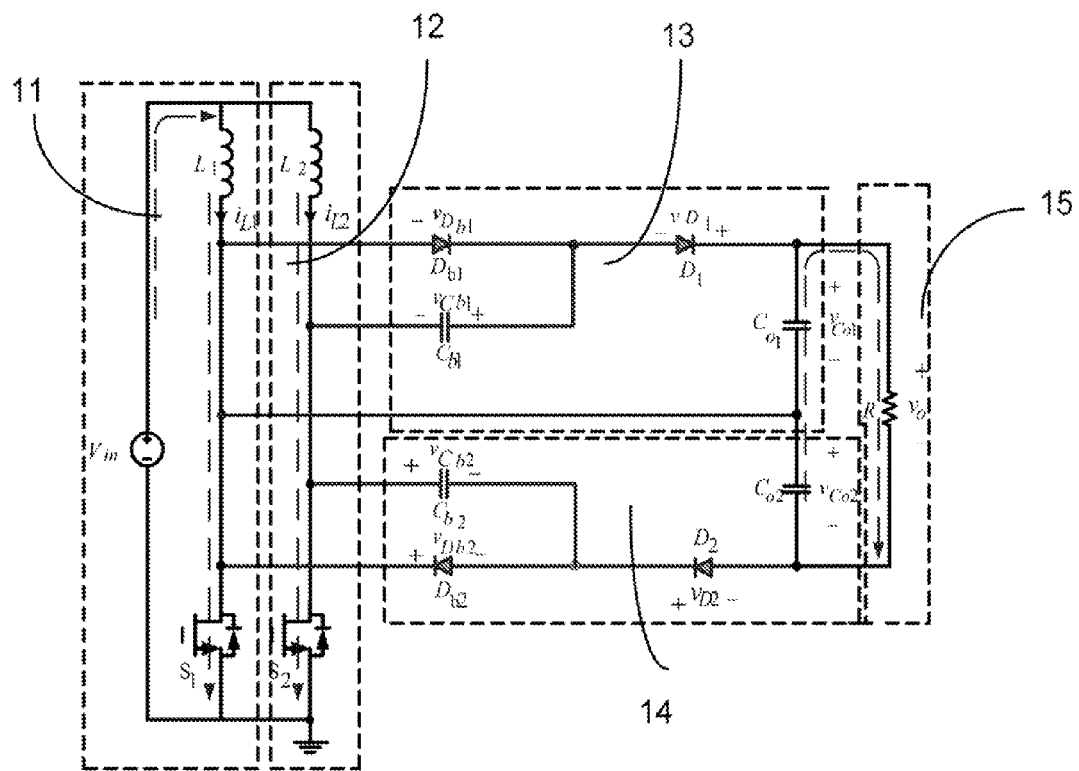
FIG. 1 is a circuit schematic diagram showing the operating mode 1 of the invention.

Please refer to FIG. 1, the invention providing a "high boost ratio DC converter", mainly including: a first switch circuit 11, a second switch circuit 12, a first storage circuit 13, a second storage circuit 14 and a load circuit 15.

Wherein, the first switch circuit 11 connects to a DC power supply Vin, which has at least one first inductor L1 and at least one first switch S1.

The second switch circuit 12 connects to the first switch circuit 11, which has at least one second inductor L2 and at least one second switch S2.

The first storage circuit 13 connects to the second switch circuit 12, which has at least one set of diodes, Db1 and D1, at least one first clamp capacitor Cb1 and at least one first output capacitor Co1.

The second storage circuit 14 connects to the second switch circuit 12, which has at least one second set of diodes Db2, and D2, at least one second clamp capacitor Cb2, and at least one second output capacitor Co2.

The load circuit 15 connects to the first output capacitor Co1 and the second output capacitor Co2, which set at least one load R, so that the first output capacitor Co1, and the second output capacitor Co2 can discharge the load R.

Figure 2:
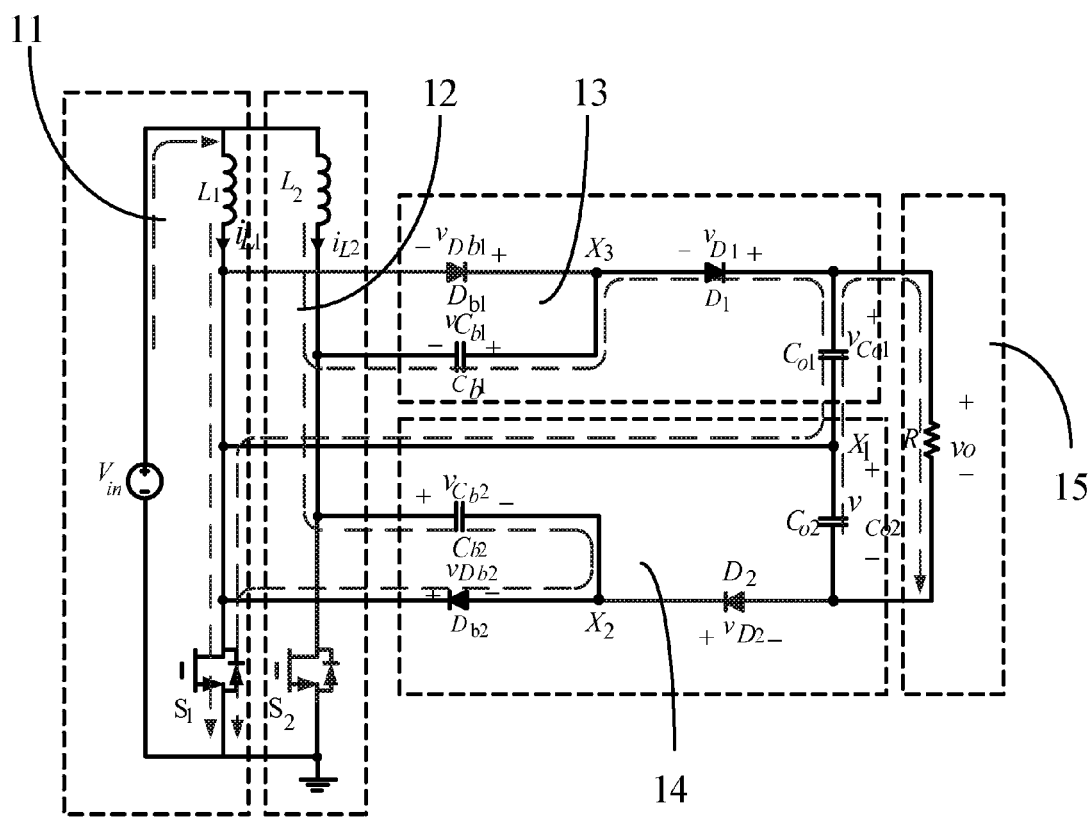
FIG. 2 is a circuit schematic diagram showing the operating mode 2 of the invention.
Figure 3:
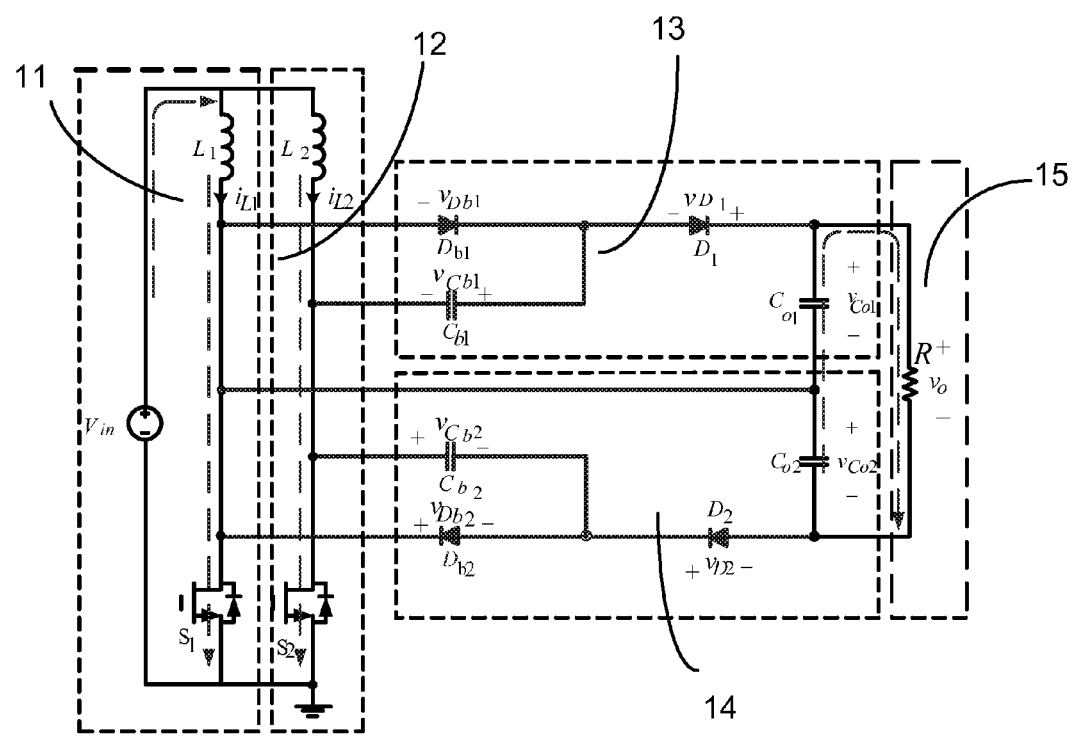
FIG. 3 is a circuit schematic diagram showing the operating mode 3 of the invention.
Figure 4:
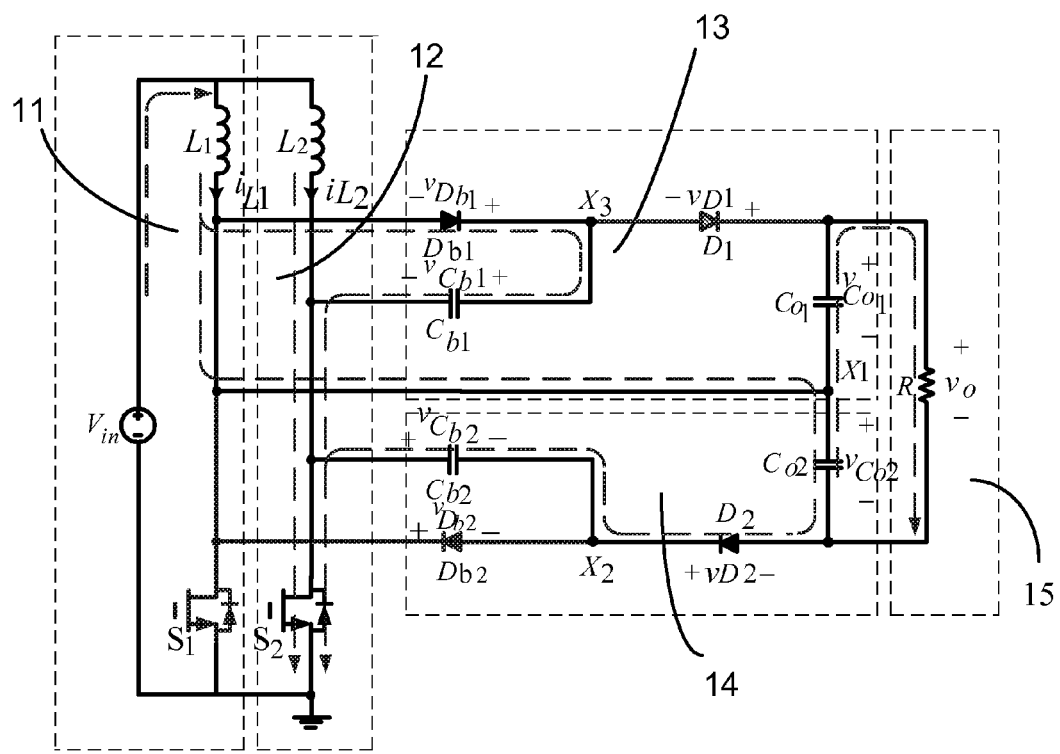
FIG. 4 is a circuit schematic diagram showing the operating mode 4 of the invention.

When in use, please refer to FIG. 2, FIG. 3 and FIG. 4, the first and second switches are controlled by a control chip (not shown in the figures) and the control chip controls the first and second switches in the following sequences: operating mode 1: the first and second switches both conduct (as shown in FIG. 1); operating mode 2: the first switch conducts and the second switch is cut off (as shown in FIG. 2); operating mode 3: the first and second switches both conduct (as shown in FIG. 3); operating mode 4: the first switch is cut off and the second switch conducts (as shown in FIG. 4) thus making the first and second inductors charge to the first and second clamp capacitors, and making the first and second clamp capacitors discharge to the first and second output capacitors, and making the first and second output capacitors discharge the load, the load voltage output from the DC power supply will be boosted owing to the discharging of the load by the first and second output capacitors. The boost ratio of the DC converter is 4/(1−D) (wherein D is the conductive cycle of the first switch and the second switch controlled by the controlling chip, simply referred to as the duty cycle), which is not only a high conversion ratio without any transformer but also decreases losses when switching the switch and when conducting as to aid and increase the efficiency of the high boost ratio DC converter.

Also, the load R can be for an electrical device (such as: household electrical appliances, computers, mobile phones, lighting devices . . . etc.). The DC power supply Vin can be a solar cell or a fuel cell.

Please refer to FIG. 1, when in operating mode 1, both the first switch S1 and the second switch S2 conduct, the voltage across the first inductor L1 and the second inductor L2 makes the current of the first inductor L1 and the second inductor L2 increase linearly so as to store the energy. The current of load-R is provided by the first output capacitor Co1 and the second output capacitor Co2.

Please refer to FIG. 2, when in operating mode 2, the first switch S1 conducts continuously, and the current of the inductor increases linearly to store the energy. The second switch S2 is cut off, the second inductor L2 will respectively charge the second clamp capacitor Cb2 and discharge to the first output capacitor Co1 with the first clamp capacitor Cb1.

In this mode, the potential of the first output capacitor Co1 is shown as below, which utilizes the concept of charge and discharge, and this operation mode also meets the voltage law.

$$X_1 = X_2 = 0$$

$$X_3 = \frac{2V_{in}}{(1-D)}$$

$$V_{Co1} = \frac{2V_{in}}{(1-D)}$$

Please refer to FIG. 3, when in operating mode 3, both the first switch S1 and the second switch S2 conduct, the voltage across the first inductor L1 and the second inductor L2 makes the current of the first inductor L1 and the second inductor L2 increase linearly so as to store the energy. The current of load-R is provided by the first output capacitor Co1 and the second output capacitor Co2.

Please refer to FIG. 4, when in operating mode 4, the second switch S2 conducts continuously, and the current of the inductor increases linearly to store the energy. The first switch S1 is cut off, the first inductor L1 will respectively charge the first clamp capacitor Cb1 and discharge to the second output capacitor Co2 with the second clamp capacitor Cb2.

In this mode, the potential of the second output capacitor Co2 is shown as below, which utilizes another auxiliary boost circuit set, but in the opposite direction. This kind of circuit connection can make the second output capacitor Co2 charge normally and conform to voltage law.

$$X_1 = \frac{V_{in}}{(1-D)}$$

$$X_2 = \frac{-V_{in}}{(1-D)}$$

$$X_3 = \frac{V_{in}}{(1-D)}$$

$$V_{Co2} = \frac{2V_{in}}{(1-D)}$$

Figure 5:
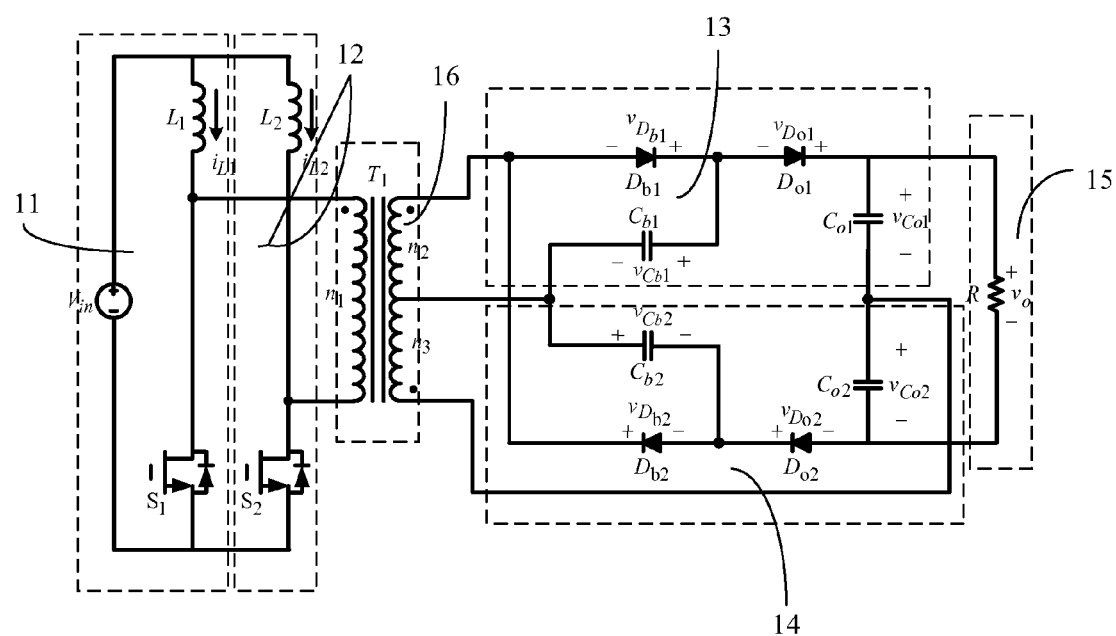
FIG. 5 is a circuit schematic diagram showing another embodiment of the invention.

In another embodiment of the invention, the high boost ratio DC converter of the present invention, which has applications not only in renewable energy as shown in FIG. 5, but also used in high-voltage pressure equipment for medical use. According to U.S. Safety requirements, when exceeding a certain wattage, an isolation transformer must be added, therefore an isolation transformer 16 is added in front of the present invention.

As shown in FIG. 5, the isolation transformer 16 (T1) is added, which can achieve electrical isolation between the load R and DC power supply Vin. And the overall gain of the high boost ratio DC converter can be significantly improved and become 4N/(1−D) after transformer 16 is added (wherein D is the conductive cycle of the first switch and the second switch controlled by the control chip, simply referred to as the duty cycle, and the turns ratio of the transformer 16 is N, N=n2/n1=n3/n1, where n1, n2 and n3 are the respective numbers of the turns corresponding to corresponding coils of the transformer (16).

Therefore, the high boost ratio DC converter of the present invention can improve the overall gain thereof to 4/(1−D) or 4N/(1−D) by using a high boost, low voltage cross switch and automatic current sharing structure when the transformer 16 is not added (wherein D is the conductive cycle of the first switch and the second switch controlled by the control chip, simply referred to as the duty cycle and the turns ratio of the transformer 16 is N, N=n2/n1=n3/n1, where n1, n2 and n3 are the respective numbers of the turns corresponding to corresponding coils of the transformer (16).

Meanwhile, in order to apply the high voltage and electrical isolation, a transformer 16 is put in front of the invention circuit as the isolation transformer, which not only maintains the advantage of automatic current sharing and a low voltage cross switch, but also further increases the overall circuit gain as 4N/(1−D) (wherein D is the conductive cycle of the first switch and the second switch controlled by the controlling chip, simply referred to as the duty cycle, and N refers to the number of coil turns of the transformer).

Comparing the high boost ratio DC converter of the present invention with the foregoing cited case and other conventional technologies, the present invention has the following additional advantages:

1. a high conversion ratio;
2. it not only has a high conversion ratio without any transformer, but also decreases losses when switching the switch and when conducting as to aid and increase the efficiency of the high boost ratio DC converter.

Many changes and modifications in the above described embodiment of the invention can, of course, be carried out without departing from the scope thereof Accordingly, to promote the progress in science and the useful arts, the invention is disclosed and is intended to be limited only by the scope of the appended claims.

What is claimed is:

1. A high boost ratio direct current (DC) converter, comprising:
    a first switch circuit connecting to a DC power supply, the first switch circuit having at least one first inductor and at least one first switch being electrically coupled to the at least one first inductor;
    a second switch circuit connecting to the first switch circuit, the second switch circuit having at least one second inductor and at least one second switch being electrically coupled to the at least one second inductor;
    a first storage circuit connecting to the second switch circuit, the first storage circuit having at least one set of diodes, at least one first clamp capacitor and at least one first output capacitor, one diode of the at least one set of diodes of the first storage circuit being electrically coupled between the first switch circuit and the at least one first clamp capacitor, and electrical currents through the one diode of the at least one set of diodes of the first storage circuit being limited from the first switch circuit toward the at least one first clamp capacitor, one end of the at least one first clamp capacitor being electrically coupled between the at least one second inductor and the at least one second switch while the other end of the at least one first clamp capacitor is electrically coupled between two diodes of the at least one set of diodes of the first storage circuit;
    a second storage circuit connecting to the second switch circuit, the second storage circuit having at least one set of diodes, at least one second clamp capacitor and at least one second output capacitor, one diode of the at least one set of diodes of the second storage circuit being electrically coupled between the first switch circuit and the at least one second clamp capacitor, and electrical currents through the one diode of the at least one set of diodes of the second storage circuit being limited from the at least one second clamp capacitor toward the first switch circuit, one end of the at least one second clamp capacitor being electrically coupled between the at least one second inductor and the at least one second switch while the other end of the at least one second clamp capacitor is electrically coupled between two diodes of the at least one set of diodes of the second storage circuit; and
    a load carrying circuit connecting to the first output capacitor and the second output capacitor, the load carrying circuit having at least one load;
    wherein the first and second switches are controlled by a control chip, and the control chip controls the first and second switches in the following sequence: the first and second switches both conduct; the first switch conducts and the second switch is cut off; the first and second switches both conduct; the first switch is cut off and the second switch conducts thus making the first and second inductors charge to the first and second clamp capacitors, and making the first and second clamp capacitors discharge to the first and second output capacitors, and making the first and second output capacitors discharge the load, the load voltage output from the DC power supply is boosted owing to the discharging of the load from the first and second output capacitors.

2. The high boost ratio DC converter of claim 1, wherein a boost ratio of the DC converter is 4/(1−D), where D is a conductive cycle of the first switch and the second switch controlled by the control chip, simply referred to as a duty cycle thereof.

3. The high boost ratio DC converter of claim 1, wherein the load is for a household electric appliance.

4. The high boost ratio DC converter of claim 1, wherein the DC power supply is a solar cell.

5. The high boost ratio DC converter of claim 1, wherein the DC power supply is a fuel cell.

6. The high boost ratio DC converter of claim 1, wherein an isolated transformer is set between the second switch circuit and the first and second storage circuits so as to electrically isolate the DC power supply from the load, and an overall gain of the high boost ratio DC converter is increased substantially to 4N/(1−D), wherein D is a conductive cycle of the first switch and the second switch controlled by the control chip, simple referred to as a duty cycle thereof, and N is a turns ratio of the transformer, N=n2/n1=n3/n1, where n1, n2 and n3 are respective numbers of turns corresponding to corresponding coils within the transformer.

* * * * *